US011363908B2

(12) United States Patent
Longoria et al.

(10) Patent No.: US 11,363,908 B2
(45) Date of Patent: Jun. 21, 2022

(54) BABY BOTTLE WARMER AND MIXER

(71) Applicant: Baby Brezza Enterprises LLC, Newark, NJ (US)

(72) Inventors: Jose Longoria, Miami, FL (US); Herman Lanier Watson, Miami, FL (US); Joshua Jameson, Acworth, GA (US)

(73) Assignee: Baby Brezza Enterprises LLC, Newark, NJ (US)

(\*) Notice: Subject to any disclaimer, the term of this patent is extended or adjusted under 35 U.S.C. 154(b) by 0 days.

(21) Appl. No.: 17/024,018

(22) Filed: Sep. 17, 2020

(65) Prior Publication Data

US 2021/0076872 A1    Mar. 18, 2021

Related U.S. Application Data

(60) Provisional application No. 62/901,305, filed on Sep. 17, 2019.

(51) Int. Cl.

| *A47J 36/24* | (2006.01) |
|---|---|
| *B01F 31/20* | (2022.01) |
| *B01F 31/50* | (2022.01) |
| *B01F 35/92* | (2022.01) |
| *B01F 35/90* | (2022.01) |
| *B01F 101/07* | (2022.01) |

(52) U.S. Cl.
CPC ............ *A47J 36/2438* (2013.01); *B01F 31/20* (2022.01); *B01F 31/50* (2022.01); *B01F 35/92* (2022.01); *B01F 2035/99* (2022.01); *B01F 2101/07* (2022.01)

(58) Field of Classification Search
CPC . A47J 36/2438; A47J 36/2433; B01F 15/065; B01F 11/0005; B01F 11/0062; B01F 2015/062; B01F 2215/0006; B01F 31/20; B01F 31/50; B01F 35/92; B01F 2035/99; B01F 2101/07; B01F 29/10; B01F 29/31; B01F 33/5014
USPC .................................................. 366/144–149
See application file for complete search history.

(56) References Cited

U.S. PATENT DOCUMENTS

| 2,700,097 A * | 1/1955 | Morey | A47J 36/2433 |
|---|---|---|---|
| | | | 219/433 |
| 3,601,372 A * | 8/1971 | Harmes | B01F 11/0014 |
| | | | 366/219 |
| 3,634,651 A * | 1/1972 | Siegel | B01L 9/06 |
| | | | 219/400 |

(Continued)

FOREIGN PATENT DOCUMENTS

| CH | 2 316 314 A2 | 5/2011 |
|---|---|---|
| CN | 2803383 Y | 8/2006 |

(Continued)

OTHER PUBLICATIONS

Philips Avent Bottle Warmer, Premium, product for sale on Amazon.com.

(Continued)

*Primary Examiner* — Charles Cooley
(74) *Attorney, Agent, or Firm* — Trueba & Suarez PLLC; Roberto M. Suarez; William R. Trueba, Jr.

(57) ABSTRACT

A bottle warming apparatus is disclosed that combines heating and agitating of a bottle and its contents in order to achieve even warming, as well as, mixing the contents of the bottle.

6 Claims, 15 Drawing Sheets

(56) References Cited

U.S. PATENT DOCUMENTS

| | | | | |
|---|---|---|---|---|
| 3,944,188 | A * | 3/1976 | Parker | B01F 11/0014 366/110 |
| 4,943,164 | A * | 7/1990 | Ohishi | B01F 11/0014 366/110 |
| 5,052,812 | A * | 10/1991 | Tannenbaum | B01F 11/0014 366/209 |
| 5,571,283 | A * | 11/1996 | Vollgold | B01F 11/0014 366/143 |
| 5,577,837 | A * | 11/1996 | Martin | B01F 11/0068 366/145 |
| 6,234,165 | B1 | 5/2001 | Creighton et al. | |
| 6,732,533 | B1 | 5/2004 | Giles | |
| 8,132,960 | B2 * | 3/2012 | Zhuang | A47J 36/2483 366/216 |
| 8,960,992 | B2 * | 2/2015 | Jong | A47J 36/2438 366/110 |
| 9,629,783 | B2 * | 4/2017 | Kim | A47J 36/2433 |
| 10,051,994 | B2 * | 8/2018 | Dunn | A47J 36/2438 |
| 10,433,672 | B2 * | 10/2019 | Alexander | A47J 36/2438 |
| 10,995,311 | B2 * | 5/2021 | Jarvius | |
| 2005/0045617 | A1 | 3/2005 | Taylor | |
| 2007/0289977 | A1 * | 12/2007 | Zhuang | A47J 36/2438 220/592.16 |
| 2008/0304356 | A1 * | 12/2008 | Zhuang | B01F 11/0011 366/239 |
| 2011/0033587 | A1 * | 2/2011 | Jong | A47J 36/2438 426/231 |
| 2015/0174012 | A1 * | 6/2015 | Kim | A47J 36/2433 215/395 |
| 2018/0127703 | A1 * | 5/2018 | Jarvius | A01N 1/0273 |
| 2021/0076872 | A1 * | 3/2021 | Longoria | B01F 15/065 |

FOREIGN PATENT DOCUMENTS

| | | |
|---|---|---|
| CN | 208598189 U | 3/2019 |
| CN | 209789614 U | 12/2019 |
| CN | 110720843 A | 1/2020 |
| DE | 0 036 612 A1 | 3/1981 |
| GB | 2557916 A | 7/2018 |
| IT | 1 967 102 A1 | 9/2008 |
| KR | 101939793 B1 | 1/2019 |

OTHER PUBLICATIONS

Pigeon Bottle and Food Warmer with Food Tray and Bottle Ladle—Off White, product for sale on www.firstcry.com.

* cited by examiner

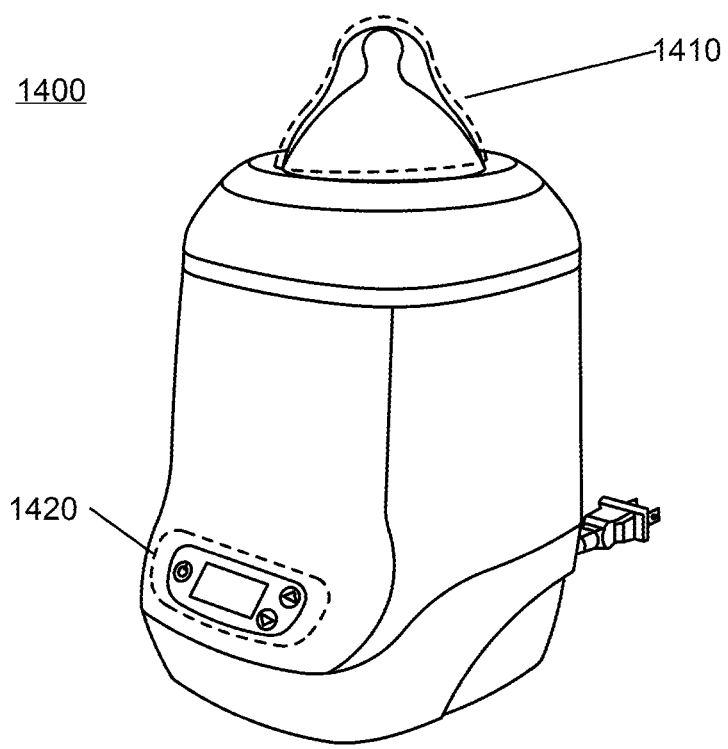
FIG. 14A
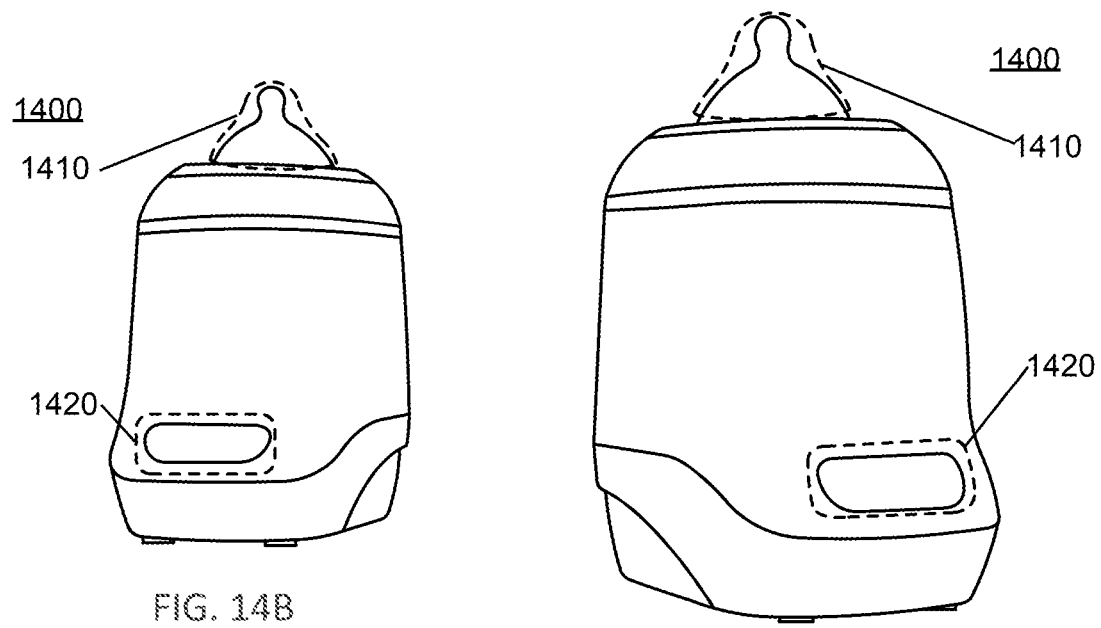
FIG. 14B
FIG. 14C

BABY BOTTLE WARMER AND MIXER

CROSS-REFERENCE TO RELATED APPLICATIONS

This application is a non-provisional of, and claims priority to, U.S. Application Ser. No. 62/901,305, titled "Baby Bottle Warmer and Mixer," filed on Sep. 17, 2019; which application is incorporated by reference herein in its entirety.

FIELD OF THE INVENTION

The present invention generally relates to apparatus and methods of heating and mixing contents in a container, and, specifically, to an apparatus and a related method of warming and agitating the contents of a baby bottle.

BACKGROUND OF THE INVENTION

There are many devices available in the marketplace designed to prepare breast milk or formula in a bottle for feeding babies. The result desired from these appliances is to deliver warm milk or formula in a dry baby bottle, quickly, without overcooking the content or harming the user or the baby with extreme heat. The available devices share certain inconveniences. For example, some use warm water to heat the milk and work slowly. Others use boiling water or steam and that extreme heat can burn the user or cook away nutrients. They can create hot spots in the milk, which is dangerous, and they wet the bottle, which is annoying. Most do not help to mix the formula powder.

There exists, therefore, a need for a baby bottle warmer and mixer to overcome the above-stated shortcomings of the known art.

SUMMARY OF THE INVENTION

Briefly, according to one embodiment, we disclose an apparatus configured to receive a container, the container having contents that are desired to be warmed up (heated) and mixed (agitated). The apparatus includes a means for heating the contents contained within the container, as well as, a means for agitating the contents contained within the container.

Additionally, a related method is disclosed. In the related method, an apparatus is provided, the apparatus having a chamber configured to receive a container having contents, a heating means, and an agitating means. Once the apparatus has been provided, the heating means creates a transfer of heat to the contents through the container, and the contents contained within the container are agitated by the agitating means. By this method, the contents of the container are heated and agitated.

As used in this specification and the appended claims, the term "container" (and its grammatical equivalents) means a vessel capable of holding contents within itself. Containers may be made of any suitable material, shape or size. Containers may be sealable, fitted with a lid, or be open. In a preferred embodiment of the invention, a container is a baby bottle capable of holding milk, formula, water or other like liquid. The baby bottle may also be configured with a lid. The baby bottle may be constructed of glass, plastic, or other suitable non-reactive material. To be operable within the scope of the present invention, the container is to be made out of a material that is capable of a heat transfer from outside the container to the inside of the container.

As used in this specification and the appended claims, the term "contents" (and its grammatical equivalents) means any one or more substance, preferably in a liquid phase (or a liquid+solid mixture capable of becoming a liquid) that is contained within the container.

As used in this specification and the appended claims, the term "means for heating" (and its grammatical equivalents) means any of various methods of creating a transfer of heat from the outside of the container to the contents within the container, including: (1) creating a flow of heated air causing a convective heat transfer between the heated air and the container; (2) heat transfer by condensation (steam) by creating steam, directing the steam to come into contact with the outer surface of the container, whereby the latent heat contained in the steam is released instantaneously and is transferred through the heat transfer surface (the container) to the contents being heated; or (3) heat transfer by conduction and/or radiation whereby the outer surface of the container is heated by contact/near contact with a heat source/element.

As used in this specification and the appended claims, the term "means for agitating" (and its grammatical equivalents) means any of various methods of mobilizing the contents within the container, including: (1) rotating the container about an axis; (2) revolving the container about an axis; (3) vibrating the container; or (4) any combination of 1, 2, or 3.

BRIEF DESCRIPTION OF THE DRAWINGS

In the accompanying figures, like reference numerals refer to identical or functionally similar elements throughout the separate views. The accompanying figures, together with the detailed description below are incorporated in and form part of the specification and serve to further illustrate various embodiments and to explain various principles and advantages all in accordance with the present invention, in which:

FIG. 14A, FIG. 14B, and FIG. 14C are composite views of a bottle warming apparatus according to an embodiment of the present invention, depicting different ornamental designs of a bottle warming apparatus, where the control panel design and the inserted bottle is shown for reference only.

Figure 1:
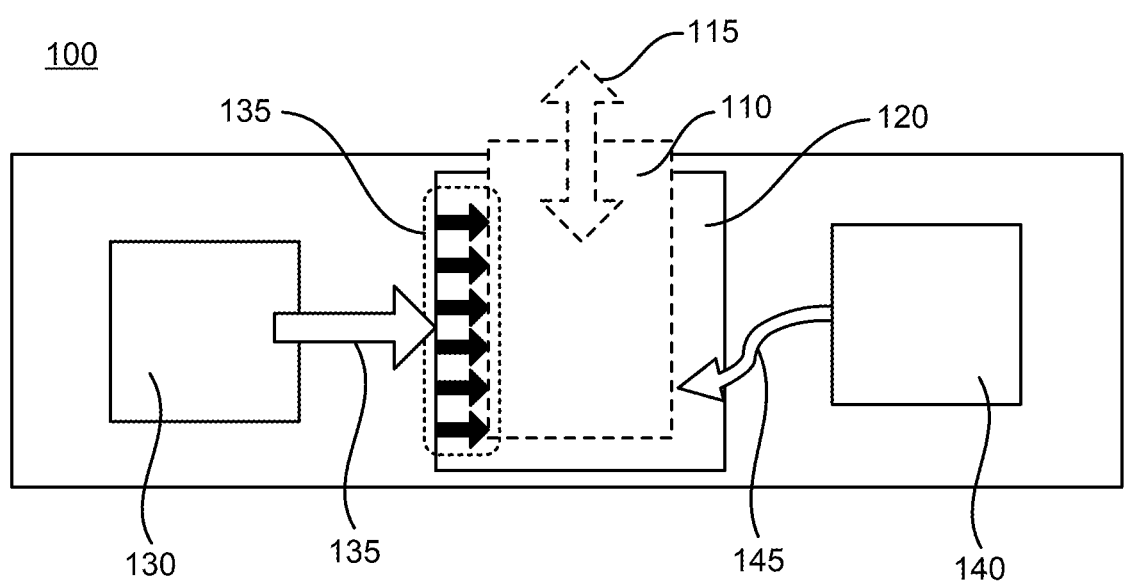
FIG. 1 is a simplified block diagram of an apparatus according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We disclose a baby bottle warmer and mixer, as well as a related method of use, that overcomes the above-stated shortcomings of the known art. In a preferred embodiment of the invention, the baby bottle warmer blows heated air along the outside of the bottle while optimizing heating time by simultaneously agitating the bottle, thereby also mixing the contents. There is no extreme heat to cause any danger and the bottle remains conveniently dry. The motion of the bottle makes it possible to mix the contents and maintain an even temperature in the milk or formula.

Referring now to the drawings in general and to FIG. 1 in particular, there is shown a simplified block diagram of an apparatus 100 that heats and agitates a container 110 having contents within at least a portion of the container 110. Since the container, itself, is not part of the apparatus 100, it is shown in dashed lines in FIG. 1, with the arrow 115 indicating that the container 110 can be inserted and removed from the apparatus 100. The apparatus 100 includes a chamber 120 that is configured to receive the container 110. Thermally communicative with the chamber 120 is a means for heating 130. The means for heating 130 produces a heat transfer 135 within the chamber 120 that acts on the container 110. The apparatus 100 further includes a means for agitating 140 that is configured to be mechanically communicative with the container 110 such that the means for agitating 140 creates a kinetic motion 145 of the contents within the container 110.

Figure 2:
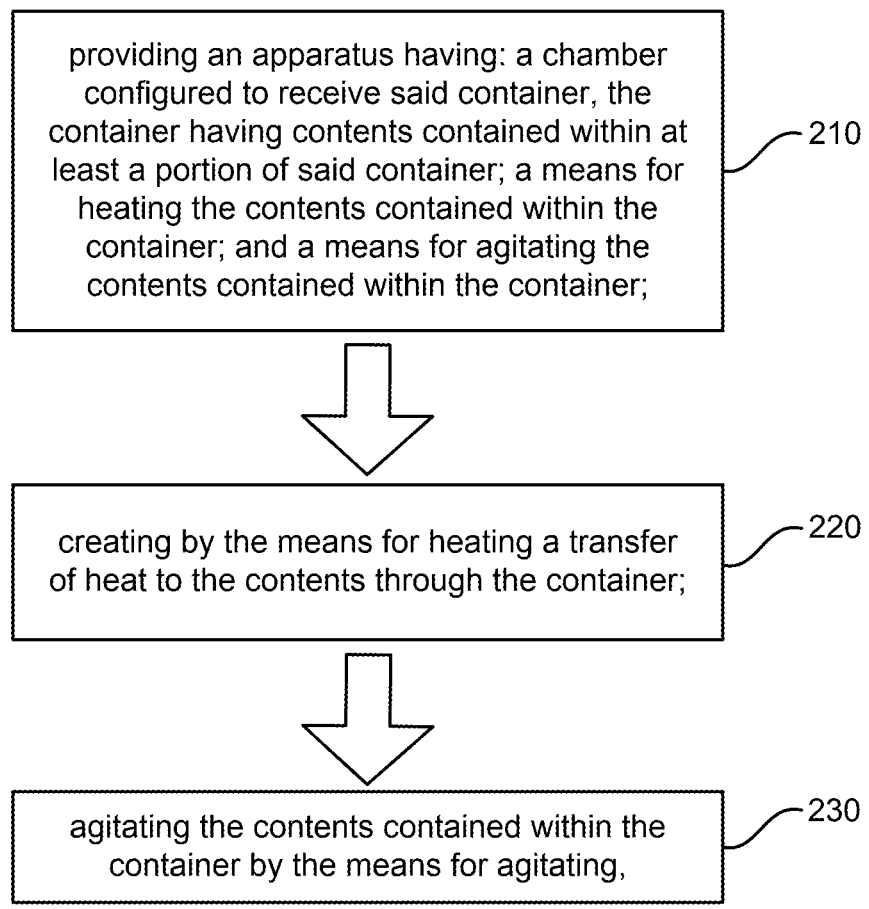
FIG. 2 is a flow chart of the method steps for using an apparatus according to an embodiment of the invention.

A method 200 of heating and agitating the contents of a container utilizing the apparatus 100 shown in FIG. 1, is disclosed in FIG. 2. The method 200 includes the steps of:

providing 210 an apparatus having: a chamber configured to receive said container, the container having contents contained within at least a portion of said container; a means for heating the contents contained within the container; and a means for agitating the contents contained within the container;

creating 220 by the means for heating a transfer of heat to the contents through the container; and agitating 230 the contents contained within the container by the means for agitating, whereby the contents of the container are heated and agitated.

Means for Heating

As used throughout this disclosure with respect to the invention, the means for heating discloses a variety of structures, or method steps as applicable, that are configured to create a heat transfer within the apparatus such that thermal energy created extrinsic to the container is transferred to the container and its contents, thereby increasing the temperature of the contents. Disclosed previously, above, the means for heating includes structures capable of producing 1) convective heat transfer, 2) heat transfer by condensation (steam), or 3) heat transfer by conduction and/or radiation.

The means for heating, regardless of the type of heat transfer, includes, at least, a heat source and a heat transfer medium.

The preferred means for heating is through convective heat transfer. This means for heating incorporates a heat source, an apparatus for creating an air flow, and a ducting to direct the air flow. As discussed herein, an embodiment of a means for heating through conductive heat flow utilizes a heating element, such as, but not limited to, a coiled wire, to which an electrical current is applied. Resistance in the wire causes the wire to heat up. An apparatus such as a blower is employed in order to create a flow of air. Structures within the apparatus are configured as ducting to direct the air flow to pass over the heating element, which heats the air. This heated air is directed through the ducting structures to pass onto and over the container having contents to be warmed. The energy in the heated air is transferred to the container and its contents as it passes. The ducting of the apparatus may be configured to the recirculate the air flow back over the heating element, or may expel the air and draw in fresh air to continue the cycle.

Heat transfer by condensation (steam) is accomplished in a similar manner. Water in a reservoir is heated by a heat source to the point that steam is created. The steam is directed via ducting structures to contact the surface of the container. As the steam condenses onto the surface of the container it transfers its energy to the container and the contents are warmed. Embodiments of the invention contemplate embodiments where the steam is forced into the chamber holding the container through the use of a blower. Additional structures may be present in other embodiments to recapture the condensate and direct it back into the water reservoir. Embodiments of the invention that utilize heat transfer by condensation may also include additional structures to dry the container before, or while removing the container from the apparatus. These embodiments may include the use of a forced air cycle (heated or not) to dry the container. Other embodiments may include the use of a mechanical wiper that wipes any remaining condensation off of the surface of the container. For example, the cover of the apparatus may be configured with a pliable membrane that is sized to wipe over the body of the bottle as the battle is removed from the chamber.

Heat transfer by conduction and/or radiation utilizes a heating element that is in contact, or near contact with the container. In embodiments, the heating element may also be directly in contact with the container.

Additional embodiments of the invention may include means for heating that also utilize digital or analog controls in order to sense, monitor, and/or regulate the temperature of the heating element, the duration of the heating cycle, and/or the temperature of the container and/or the contents of the container.

Means for Agitating

As used throughout this disclosure with respect to the invention, the means for agitating discloses a variety of structures, or method steps as applicable, that are configured to create a kinetic motion of the contents within the container, thereby promoting an even heat transfer throughout the contents, as well as, promoting the mixture of the contents as in the case of liquid and powder mixtures, for example. Disclosed previously, above, the means for agitating includes structures capable of 1) rotating the container about an axis, 2) revolving the container about an axis, 3) vibrating the container, or 4) any combination of 1, 2, or 3.

The preferred means for agitating is through a combination of rotating and revolving the container. This means for agitating incorporates a structure that supports the container at least at two points of contact. FIGS. 4-10 in general, and FIGS. 4 and 9, specifically, illustrate an embodiment of this means for agitating. A top cover 401 is configured to contact the container 412 at a point near the top of the container and another structure, for example, the bottle holder 404 shown in FIG. 10, supports the container at its bottom. The bottle holder 404 is, itself, attached to a base 405 which is free to rotate. The bottle holder 404 is located on this base 405 at a location offset from its axis of rotation. In this way, as the base 405 rotates, the container 412 (which is askew from the base's axis of rotation) revolves about the base's axis. Additionally, the bottle holder 404 may be attached to pivot or rotate about its own axis, thereby creating a secondary (rotating) motion of the container 412. In embodiments, the rotating base 405 is an impeller that is free to rotate—this rotation created by way of an air flow 413 passing through the impeller blades. Alternatively, the base motion may be accomplished via a motor attached directly to the base or via a gear and/or belt system.

In other embodiments, the means for agitating is accomplished via a vibrator mechanism adapted to vibrate the container. As described above, the vibrator mechanism may be coupled with the rotating or revolving mechanism(s) to create a vibrating-plus-rotating/revolving means of agitating the contents of the container.

The means for agitating may be passive—as through the use of an impeller mechanism—or active (by employing a motor or other mechanical drive mechanism). Additionally, the means for agitating may be controlled by way of a digital or analog controller. In this way, the means for agitating may be controlled with respect to duration or strength of agitation.

EXEMPLARY EMBODIMENTS

Following are non-limiting embodiments of the invention. One skilled in the art would recognize that not all details or components are detailed here, for compactness of disclosure, but the disclosed elements are presented to enable a person of skill in the art to understand the exemplary embodiments without undue experimentation. For example, it is understood that a heating element would require a power source, although the power source is not detailed in this disclosure.

Example 1

Figure 3:
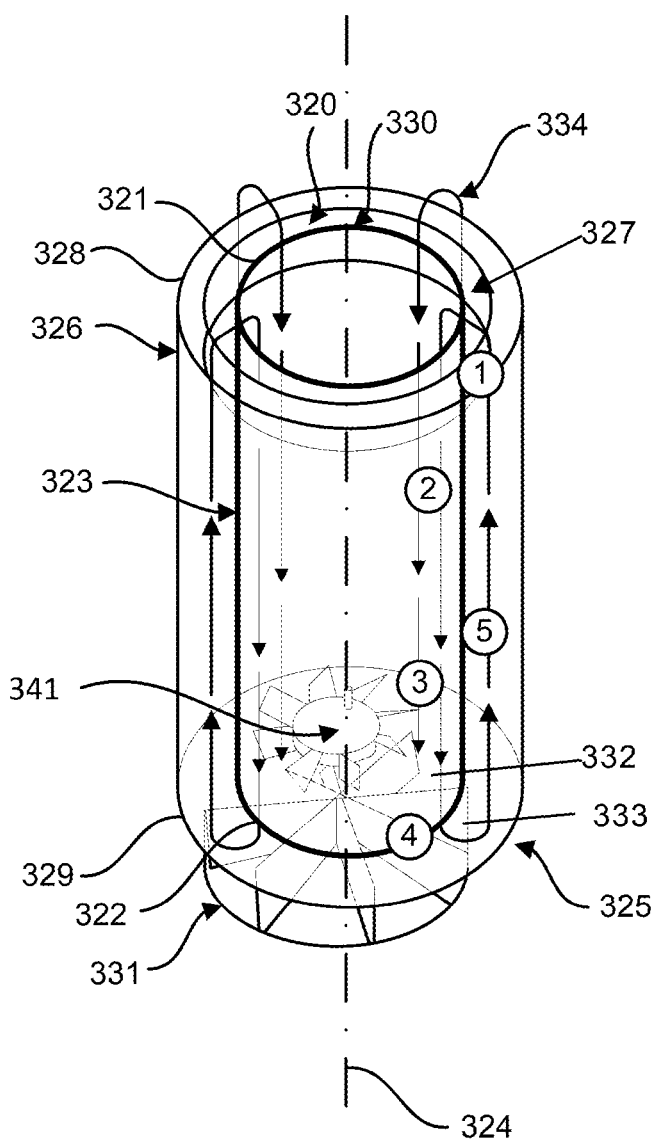
FIG. 3 is a simplified drawing of an apparatus according to an embodiment of the invention illustrating the major components, as well as, the air path in this embodiment.
Figure 4:
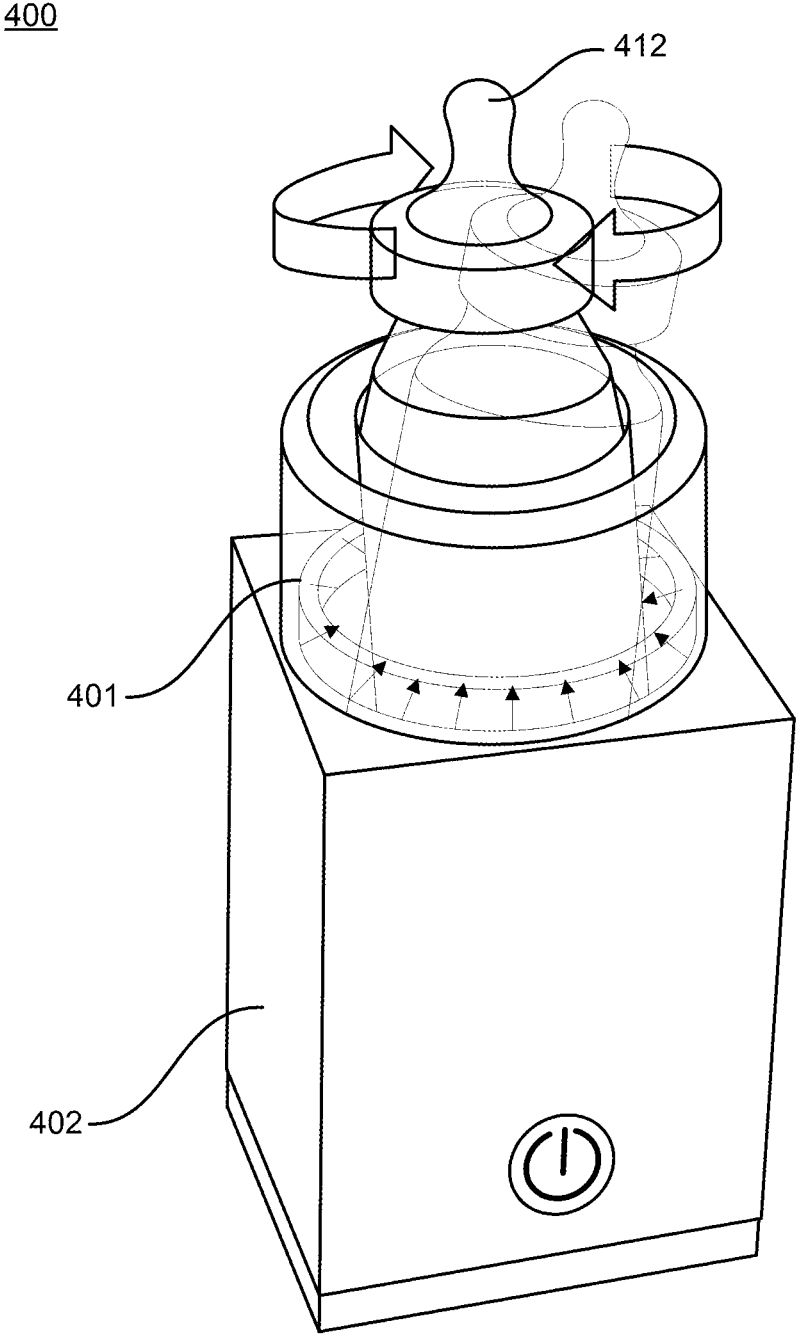
FIG. 4 is an illustration of a bottle warmer appliance, with a bottle (for reference), according to an embodiment of the invention.
Figure 5:
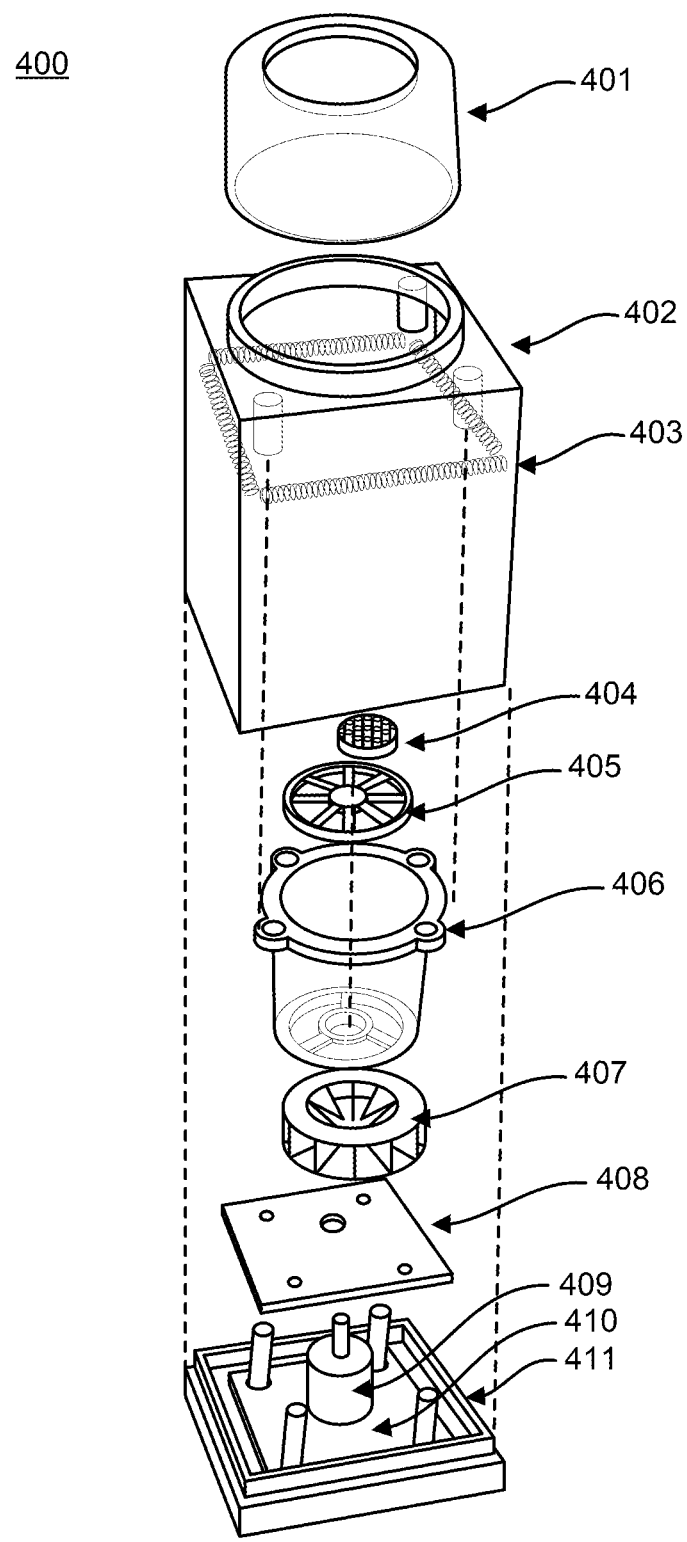
FIG. 5 is an exploded view of the bottle warmer appliance of FIG. 4.
Figure 6:
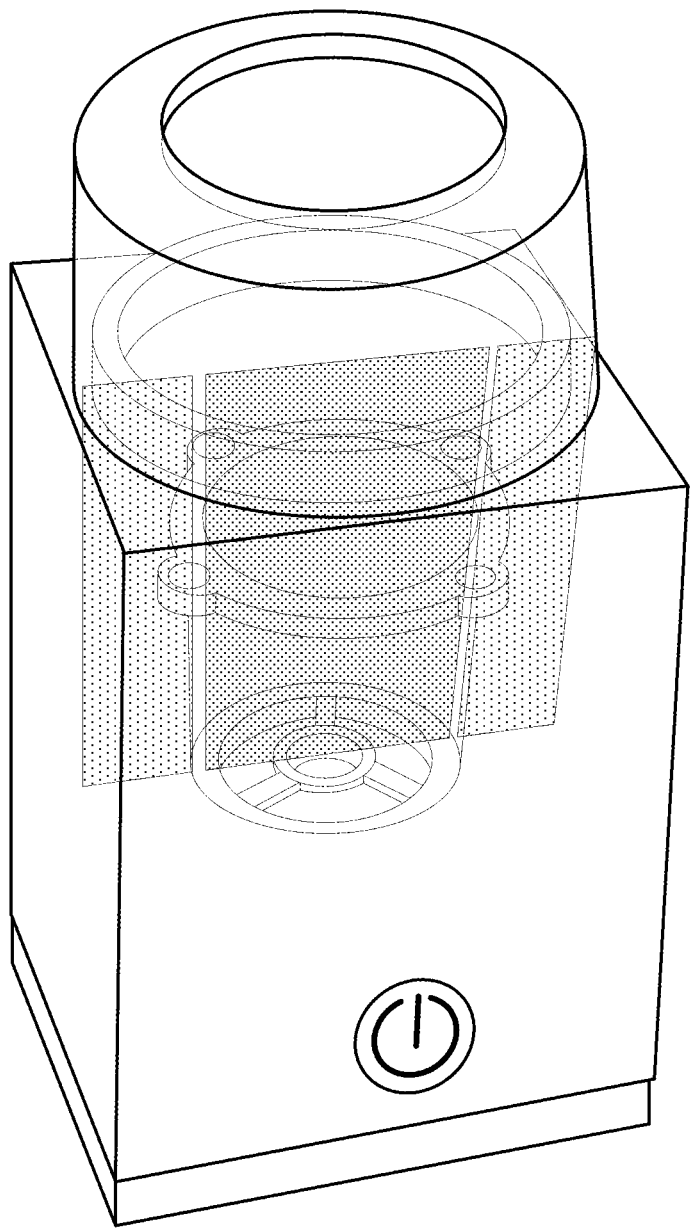
FIG. 6 is a partial internal view of the bottle warmer apparatus of FIG. 4, with some components shown in transparent view to illustrate internal components.
Figure 7:
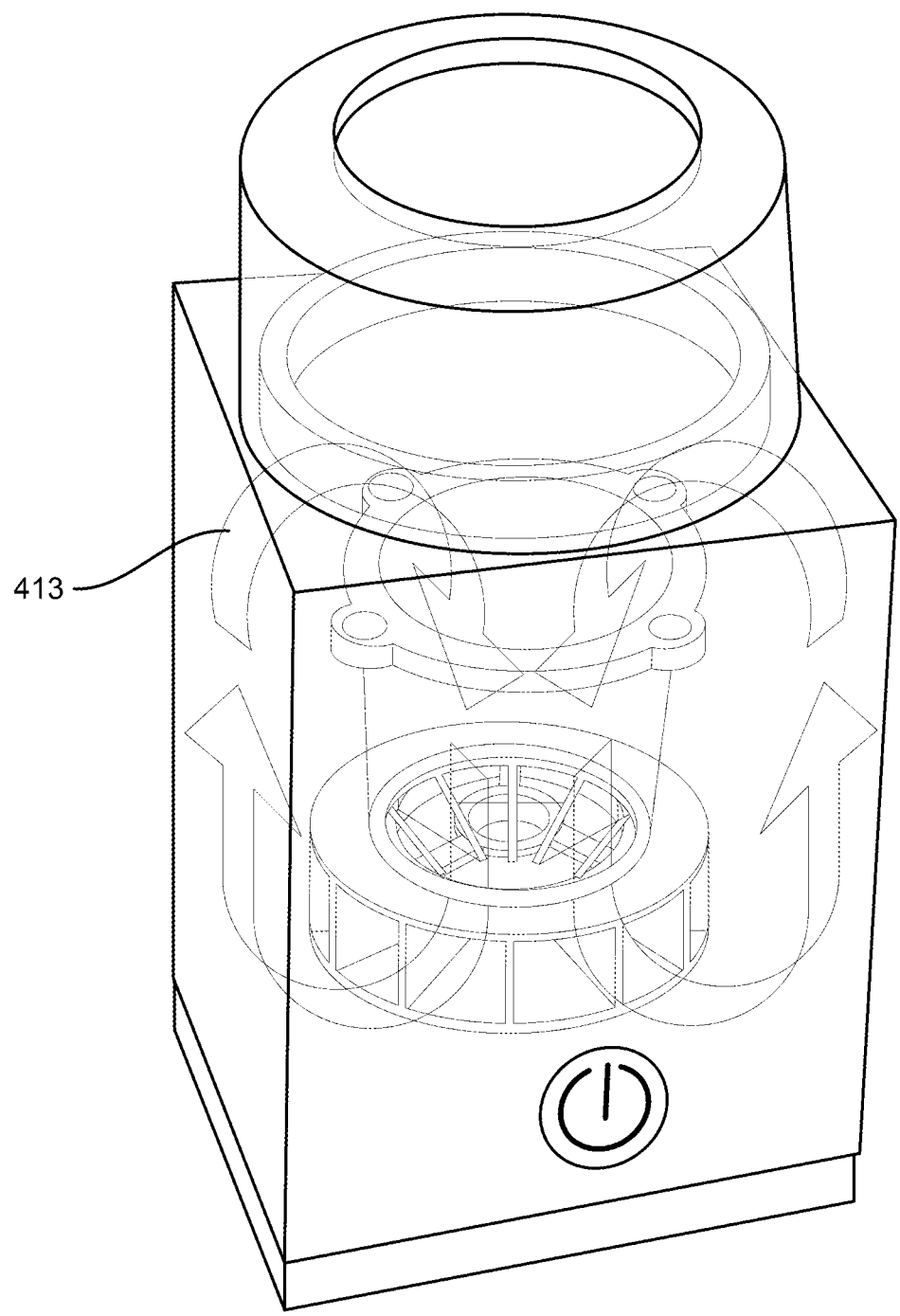
FIG. 7 is a partial internal view of the bottle warmer apparatus of FIG. 4, with some components shown in transparent view to illustrate internal components and the toroidal air flow pattern.
Figure 8:
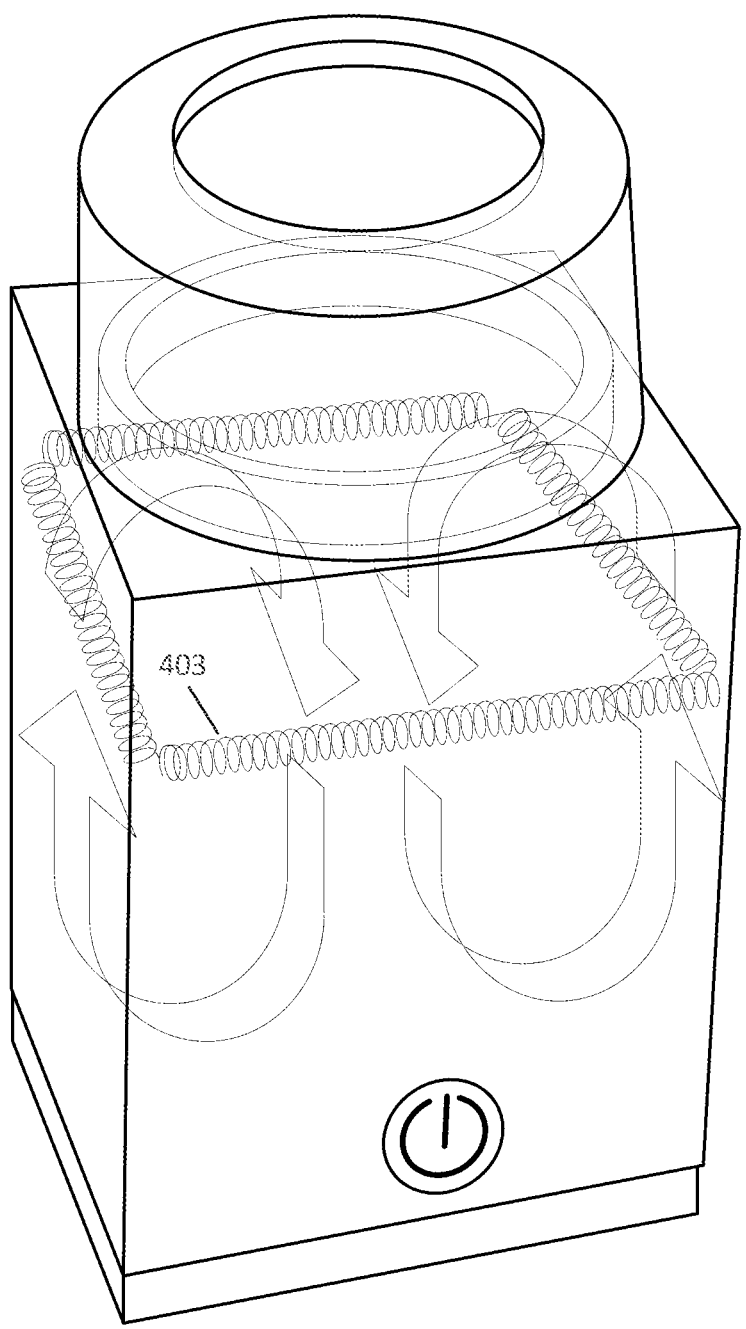
FIG. 8 is a partial internal view of the bottle warmer apparatus of FIG. 4, with some components shown in transparent view to illustrate internal components and the means for heating.
Figure 9:
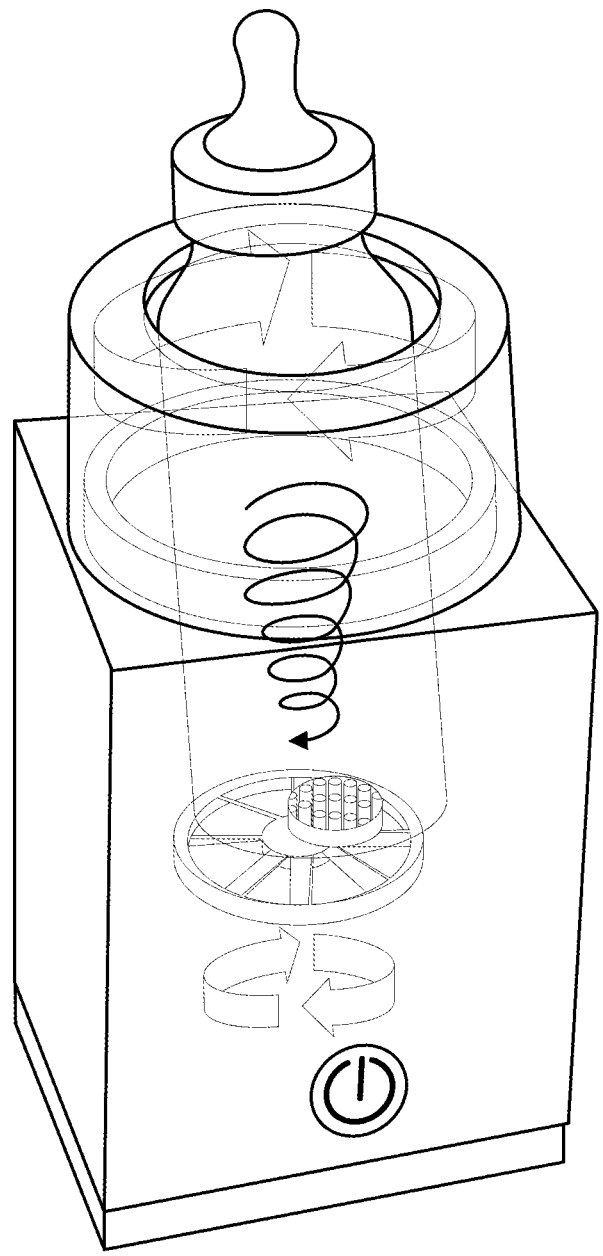
FIG. 9 is a partial internal view of the bottle warmer apparatus of FIG. 4, with some components shown in transparent view, and a bottle shown for reference, to illustrate internal components and the means for agitating.
Figure 10:
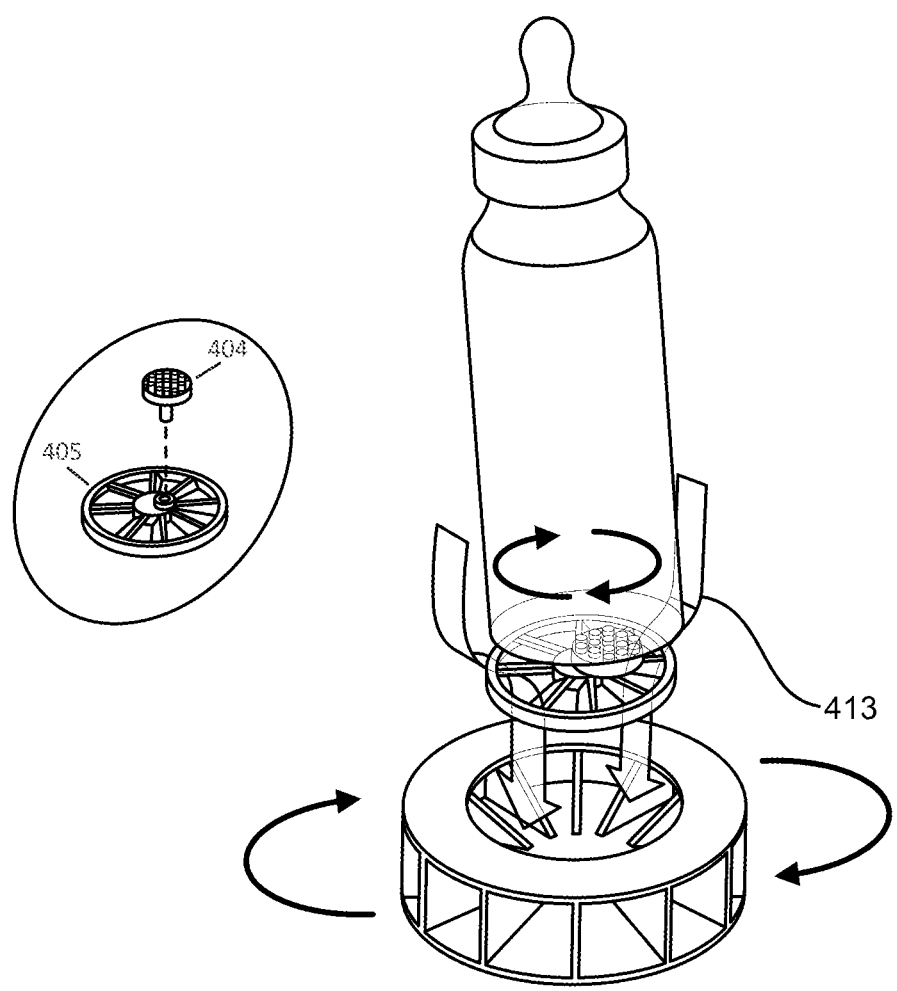
FIG. 10 is a partial internal view of the bottle warmer apparatus of FIG. 4, with some components not shown (for clarity), and a bottle shown for reference, to illustrate internal components, the means for agitating, and how it operates with respect to the blower and the air flow.

Referring to FIG. 3, an exemplary embodiment according to the invention discloses an apparatus 300 for warming the contents of a container (not shown), such as a baby bottle. The apparatus 300 includes an inner structure 320 configured to receive the container, said inner structure 320 defined by a proximal top opening 321, a distal bottom opening 322, an inner wall 323 disposed between the proximal top opening 321 and the distal bottom opening 322, and a central axis 324 aligned with the proximal top opening 321 and the distal bottom opening 322. Surrounding the inner structure 320 is an outer structure 325 configured to receive the inner structure 320 in substantial alignment with respect to the central axis 324, said outer structure 325 defined by an outer wall 326 disposed offset from the inner wall 323 further defining an air path 327, a proximal end 328 disposed proximate to and communicative with the proximal top opening 321, and a distal end 329 proximate to the distal bottom opening 322.

A heating element 330 is disposed within the air path 327.

A blower 331 having an inlet 332 and an outlet 333 configured such that the inlet 332 is operably communicative with the distal bottom opening 322 and the outlet 333 is operably communicative with the distal end 329, wherein the blower 331 creates an air flow 334 that draws air in through the inlet 332 from the inner structure 320, out through the outlet 333, into the air path 327 defined by the outer structure 325, over the heating element 330, and through the proximal end 328 into the inner structure 320 through the proximal top opening 321.

The arrows in FIG. 3 illustrate that the arrangement of the components here create an air flow 334 that is substantially toroidal in nature. Cold air is drawn into the blower and expelled over the heating element, where it is heated. The now-heated air is then directed to flow into the inner structure where it will flow over the inserted container, thereby causing an heat exchange between the heated air and the cooler bottle. The cooled-off air is then drawn back into the blower and the cycle continues.

Additionally, a means for agitating is disposed within the inner structure 320. The means for agitating 340 is configured to contact the container 310. In this example, the means for agitating 340 is accomplished by a one or more impellers 341 assembled within the inner structure 320. The blades of the impeller 341 are configured to be communicative with the air flow 334, wherein the air flow 334 interacts with the one or more impellers 341 causing it to rotate. Preferably, the axis of rotation of the impeller coincides with the centerline of the inner structure, in this way, the action of the air flow on the impeller 341 is most efficient. Additionally, the impeller may be adapted with a protrusion (not shown). In this case, the protrusion is configured to be in contact with the container, as opposed to the impeller. The protrusion is preferably located on the impeller body offset from the impeller's axis of rotation, such that the rotation of the impeller will be translated into an eccentric motion of the container. (This is illustrated, for example, in FIG. 10.)

Example 2

Referring to FIGS. 4-10, an exemplary embodiment according to the invention discloses an electric appliance 400 that heats a baby bottle 412. The appliance 400 features a clear cover 401 (which can be interchangeable to fit specific bottles in the market), a housing top 402, a heating element 403, a bottle holder 404 mounted to an impeller 405, a bottle chamber 406, a blower 407, a heat shield/motor holder 408, a motor 409, a printed circuit board 410, and a housing bottom 411.

The chamber 406 is configured to receive the baby bottle 412. The means for heating is the heating element 403 in the form of a coil heater, and a motorized blower 407 that causes air to circulate in a pattern around the bottle 412. At the same time the heating occurs, it moves the bottle 412 to speed up the heating of the milk, while helping the outside of the bottle 412 remain cool. It has a cover 401 that can be interchangeable to fit with various available baby bottles.

The hot air path 413 in the appliance 400 is designed with a bottle chamber 406 in the middle and an outer chamber 402. A motorized blower 407 moves the air by continuously pushing it up the outer chamber and sucking it back down through the bottle chamber. See FIG. 7.

A heating element 403 is embedded in the hot air path 413 to affect the temperature of the air as desired by regulating an electrical current that flows through it. See FIG. 8.

An agitator is positioned in the housing to make the contents of the bottle move around inside. This prevents hot-spots and can mix the contents like frozen breast milk or powdered formula. See FIG. 9.

The agitator, in a preferred embodiment, can be powered by the air that is moving in the bottle chamber. The bottle rests on top of a bottle holder. The bottle holder is connected to an impeller in a location off-center of the impeller. When the blower sucks the air down through the bottle chamber, the impeller spins powered by the air in motion. (It works like a pin-wheel.) In this exemplary embodiment, the impeller is not attached to any motor shaft (although other embodiments contemplate the use of a motor to drive the agitator). As a result of the motion, the bottle holder agitates the bottle making the liquid content of the bottle swirl around. This increases the transfer of heat, keeps the bottle cool on the outside and the contents heat faster. See FIG. 10.

Example 3

Another exemplary embodiment of the present invention is a bottle warmer apparatus having a bottle chamber configured to receive a bottle, the bottle having a top end, a bottom end, and contents, such that the bottom end is contained within the bottle chamber. An outer chamber is configured to surround the bottle chamber and disposed at a distance offset from the bottle chamber defining an air path between the bottle chamber and the outer chamber. A heating element is disposed in the air path between the bottle chamber and the outer chamber and a blower is configured to produce an air flow in the air path. An agitator is configured to agitate the contents of the bottle while the bottle is received within the bottle chamber.

Additionally, this embodiment may further include one or more of the following optional structures/features: a blower having an air intake that is communicative with the bottle chamber and an air outlet that is communicative with the outer chamber; an air path that is a substantially closed circuit directing the air flow into the air intake, out the air outlet, over the heating element, into the bottle chamber, and back into the air intake; an agitator that is an impeller disposed within the bottle chamber and in the air path such that the air flow through the air path rotates the impeller; an agitator where the impeller further comprises a bottle holder, the bottle holder configured to remain in mated contact with the bottom end of a bottle received within the bottle chamber such that the bottle holder rotates with the impeller; an agitator where the bottle holder is in rotational relation with the impeller; an outer housing, the housing comprising an opening communicative with the bottle chamber; or a cover configured to receive the top end of the bottle.

Example 4

An embodiment of the present invention in the form of a bottle warmer having a bottle chamber having an open end and defining a retention compartment, a means for agitating a bottle retained within the retention compartment, and a heated air blower operably coupled to the bottle chamber for blowing a heated air flow over the bottle retained within the retention compartment as the bottle is agitated by the agitating means, wherein the bottle is warmed by the heated air flow.

Example 5

Another embodiment of the present invention is in the form of a method of using the invention disclosed herein. A method of warming a bottle, according to an embodiment of the invention, includes the steps of: providing a chamber configured to receive a bottle; providing a means for creating an air flow of heated air through the chamber; and providing an agitator configured to be operably coupled to the bottle, whereby the bottle is warmed by the air flow.

Example 6

Figure 11:
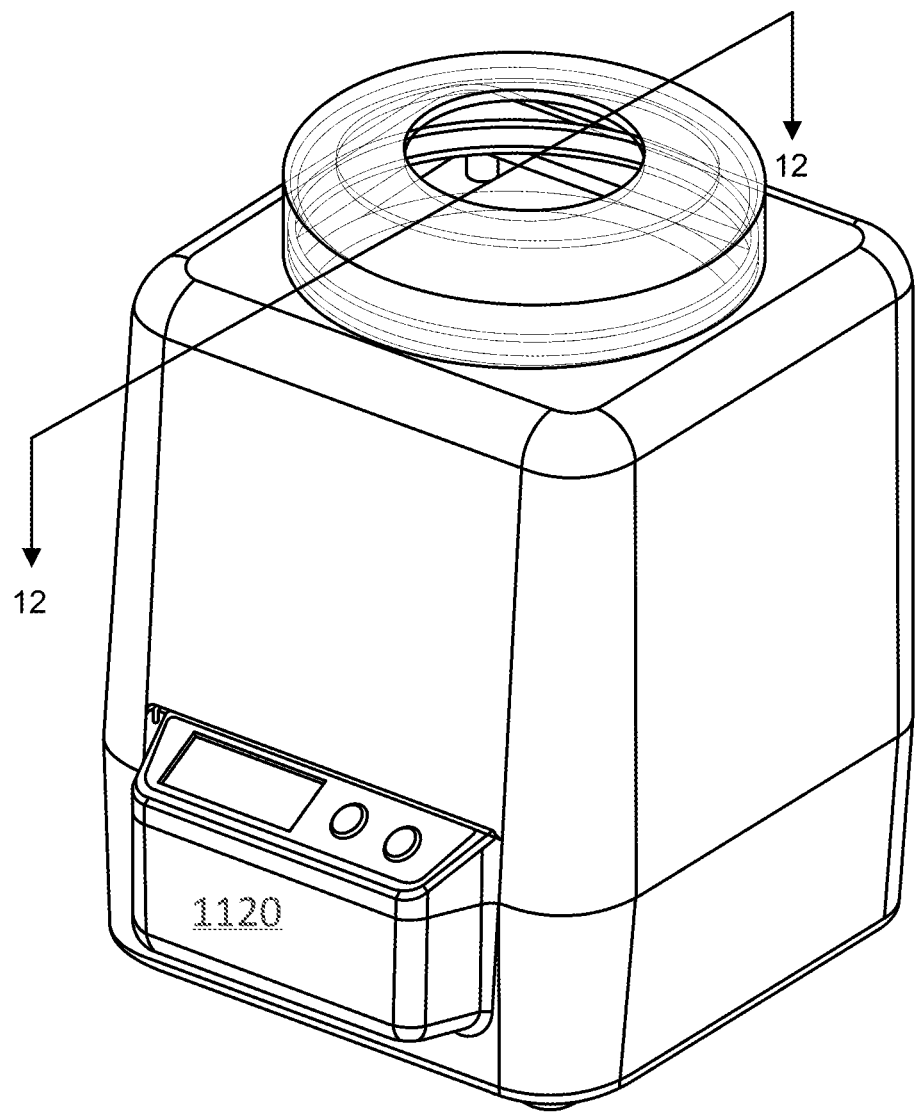
FIG. 11 is an isometric view of an apparatus according to an embodiment of the present invention, depicting an external housing, a clear cover, and a control and information panel.
Figure 12:
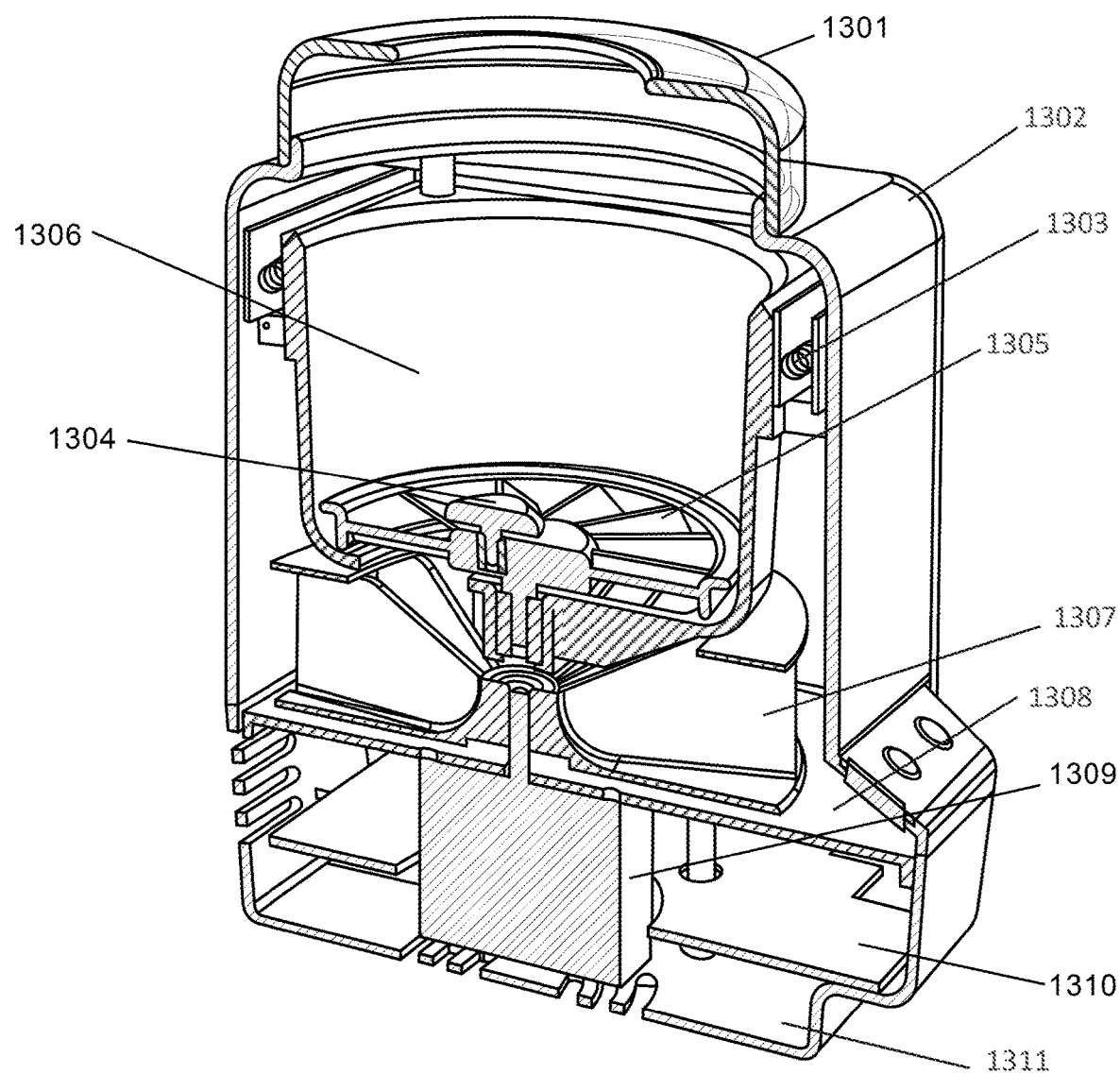
FIG. 12 is an isometric cross-sectional view of the apparatus shown in FIG. 11, illustrating the internal components.
Figure 13:
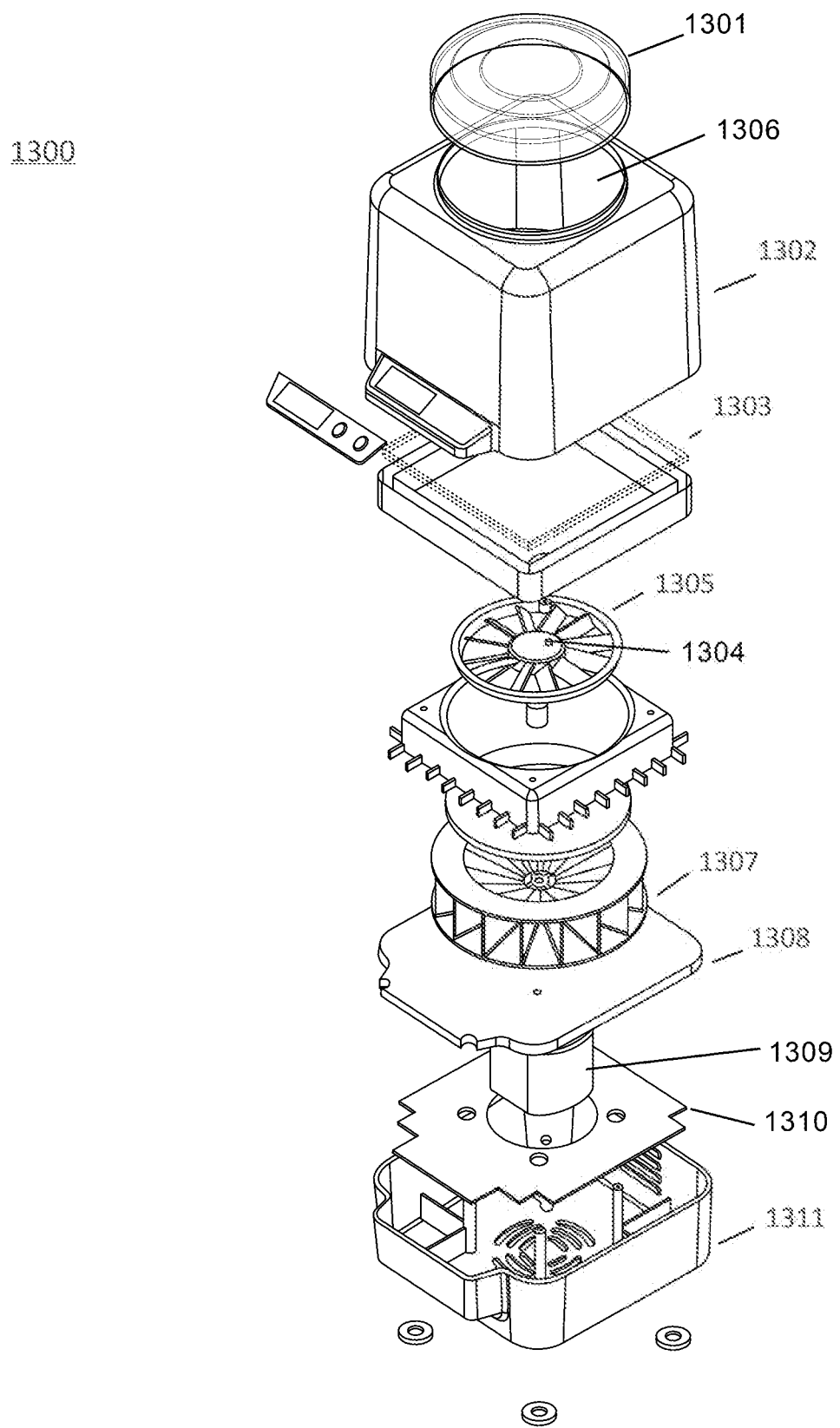
FIG. 13 is an exploded view of the apparatus shown in FIG. 11.

FIGS. 11-13 illustrate a bottle warming apparatus 1300 according to an embodiment of the invention. This exemplary embodiment includes a means for heating that utilizes a convective air flow that passes over a coil heater element 1303. The air flow is provided by a blower 1307. Located in the bottle chamber 1306 is the means for agitating which is accomplished via an impeller 1305 that is mounted to freely rotate and is in line with the blower 1307 above a heat shield/motor holder 1308 atop the motor 1309. A printed circuit board (PCB) 1310 is disposed between the motor 1309 and the bottom 1311 of the bottle warming apparatus 1300. A bottle holder 1304 is mounted off-center on the impeller 1305 and is configured to freely rotate and receive the bottom of the bottle. A cover 1301 with an opening is configured to fit over the top of the bottle and provides a second point of contact for the bottle as it rests on the bottle holder 1304 within the housing top 1302. Additional components, such as a control panel and display 1120 are shown in FIG. 11.

Example 7

The ornamental design of a bottle warming apparatus 1400, according to an embodiment of the present invention, is shown in the views of FIG. 14A, FIG. 14B, and FIG. 14C. The bottle 1410 and control panel 1420 are is depicted in dashed lines, as they are shown for reference only. In this exemplary embodiment, the top cover is adapted to receive the bottle in inserted relation and is preferably manufactured out of a molded and pliable material. In this way, the soft molded cover can provide a close fit to the bottle, even if the bottle has an irregular shape. A soft molded cover such as this can also provide "give"—meaning that, due to its pliable nature, it can allow the apparatus to accept bottles of varying sizes.

Figure 15C:
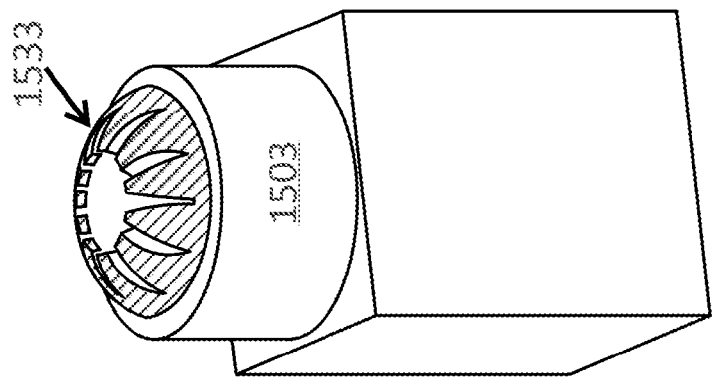
FIG. 15A, FIG. 15B, and FIG. 15C show three different views of the same bottle warming appliance, showing different versions of covers to accept various size bottles, according to an embodiment of the present invention.
Figure 15B:
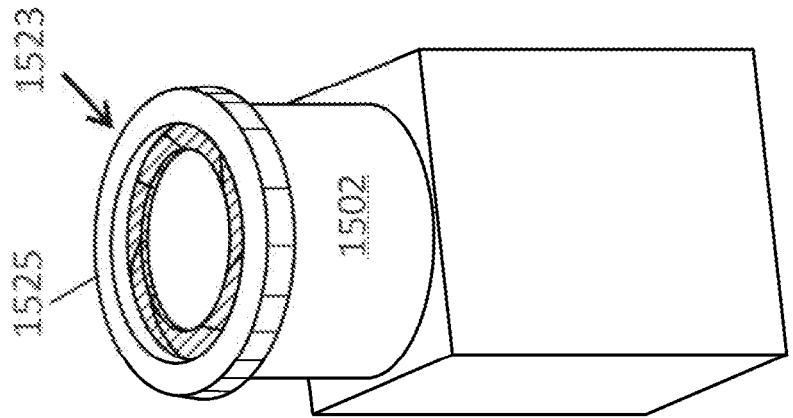
Figure 15A:
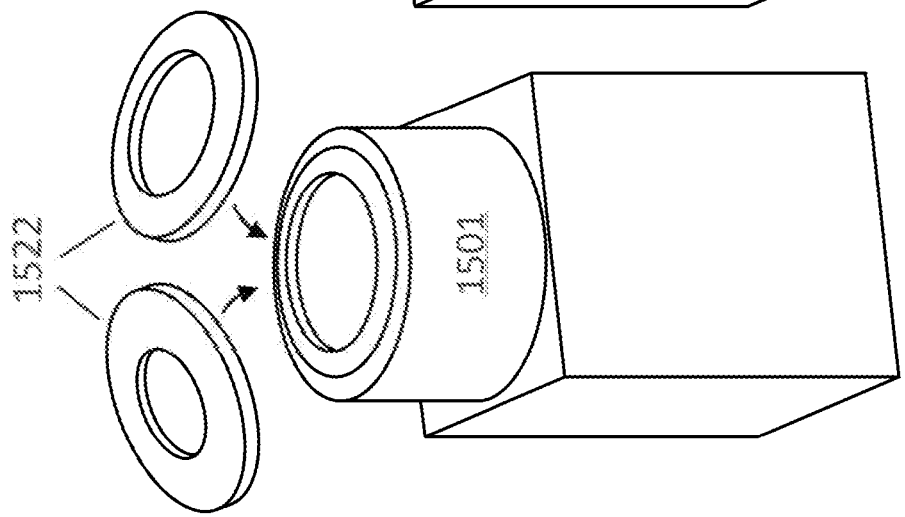

Examples of different cover adaptations are illustrated in FIG. 15A, FIG. 15B, and FIG. 15C and are contemplated to be within the scope of the present invention. In addition to the cover with a fixed-size opening, as depicted in the other figures, the covers 1501 shown in FIG. 15A, FIG. 15B, and FIG. 15C illustrate three other versions. FIG. 15A shows one version of a cover 1501 that includes interchangeable rings 1522 having different inner diameters. FIG. 15B shows a second cover 1502 that includes a mechanical iris device 1523, where the size of the opening can be adjusted to accept various size bottles by turning an outer ring 1525. FIG. 15C shows a third type of cover 1503 that incorporates a flexible portion 1533 that is configured to deflect in relation to an inserted bottle and to accept various size bottles.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims. Modifications and changes to the invention should be readily apparent to those having ordinary skill in the art, which modifications are intended to be within the spirit and scope of the invention as claimed. It is also understood that the foregoing description is illustrative of the present invention and should not be considered as limiting. Components from one embodiment can be combined with another embodiment and remain within the spirit and scope of the invention. Therefore, other embodiments of the present invention are possible without departing from the spirit and scope of the present invention.

What is claimed is:

1. An apparatus adapted to receive, heat, and agitate a container having contents therein, the apparatus comprising:
   a chamber configured to receive the container and support the container at a first region of contact located adjacent to a top of the chamber and an upper portion of the container;
   a means for heating disposed outside of the chamber, whereby the means for heating produces and introduces a heated convective airflow within the chamber to act on the container; and
   a means for agitating configured to be mechanically communicative with the container in the chamber at a second region of contact disposed distally from the first region of contact and located near a bottom of the chamber and a bottom of the container, whereby the means for agitating is a member movable about an axis and the second region of contact is a container holder disposed on said member and located eccentric to the axis thereby presenting a constantly changing eccentric orientation of the container relative to the heated convective air flow and the chamber and generating a kinetic motion of the contents within the container; where the movable member comprises an impeller configured to be driven into movement by the heated convective air flow.

2. The apparatus of claim 1, wherein the means for heating further comprises at least one controller configured to perform one or more of:
   sensing the temperature of a heating element;
   monitoring the temperature of a heating element;
   regulating the temperature of a heating element;
   controlling the duration of a heating cycle;
   sensing the temperature of the container; or
   sensing the temperature of the contents.

3. The apparatus of claim 1, wherein the means for agitating further comprises at least one controller configured to perform at least one of:
   controlling a strength of agitation; or
   controlling a duration of agitation.

4. The apparatus of claim 1 wherein the chamber includes a housing disposed outside of the chamber.

5. The apparatus of claim 1 further comprising a power supply.

6. A baby bottle warming and mixing apparatus employing turbulent heated air and eccentric agitation to produce rapid heating while keeping the baby bottle dry, the baby bottle warming and mixing apparatus comprising:
   a bottle chamber having a bottle chamber wall defining a bottle chamber interior and a bottle chamber exterior, configured to receive the baby bottle in inserted relation thereto within the bottle chamber interior at a first offset distance from the bottle chamber wall, said first offset distance defining a bottle chamber air path, and further configured to support the baby bottle at a first region of contact located adjacent a top of the bottle chamber and an upper portion of the baby bottle;
   an outer chamber having an outer chamber wall disposed offset from the bottle chamber exterior at a second offset distance from the bottle chamber wall, said second offset distance defining an outer chamber air path, where the bottle chamber air path is in fluid communication with the outer chamber air path;
   a heating element disposed within the outer chamber air path;
   a motorized blower configured to create a dry air flow such that the dry air flow circulates continuously through the bottle chamber air path, into the outer chamber air path, over the heating element, and back into the bottle chamber air path; and
   an agitator configured to be mechanically communicative with the baby bottle in the bottle chamber at a second region of contact disposed distally from the first region of contact and located near a bottom of the bottle chamber and a bottom of the baby bottle, whereby the agitator is a member movable about an axis and the second region of contact is a baby bottle holder disposed on said member and located eccentric to the axis thereby presenting a constantly changing eccentric orientation of the baby bottle relative to the dry air flow and the bottle chamber and generating a kinetic motion of the contents within the baby bottle;
   where the movable member further comprises an impeller configured to be driven into movement by the dry air flow.

\* \* \* \* \*